Figures 1, 2:
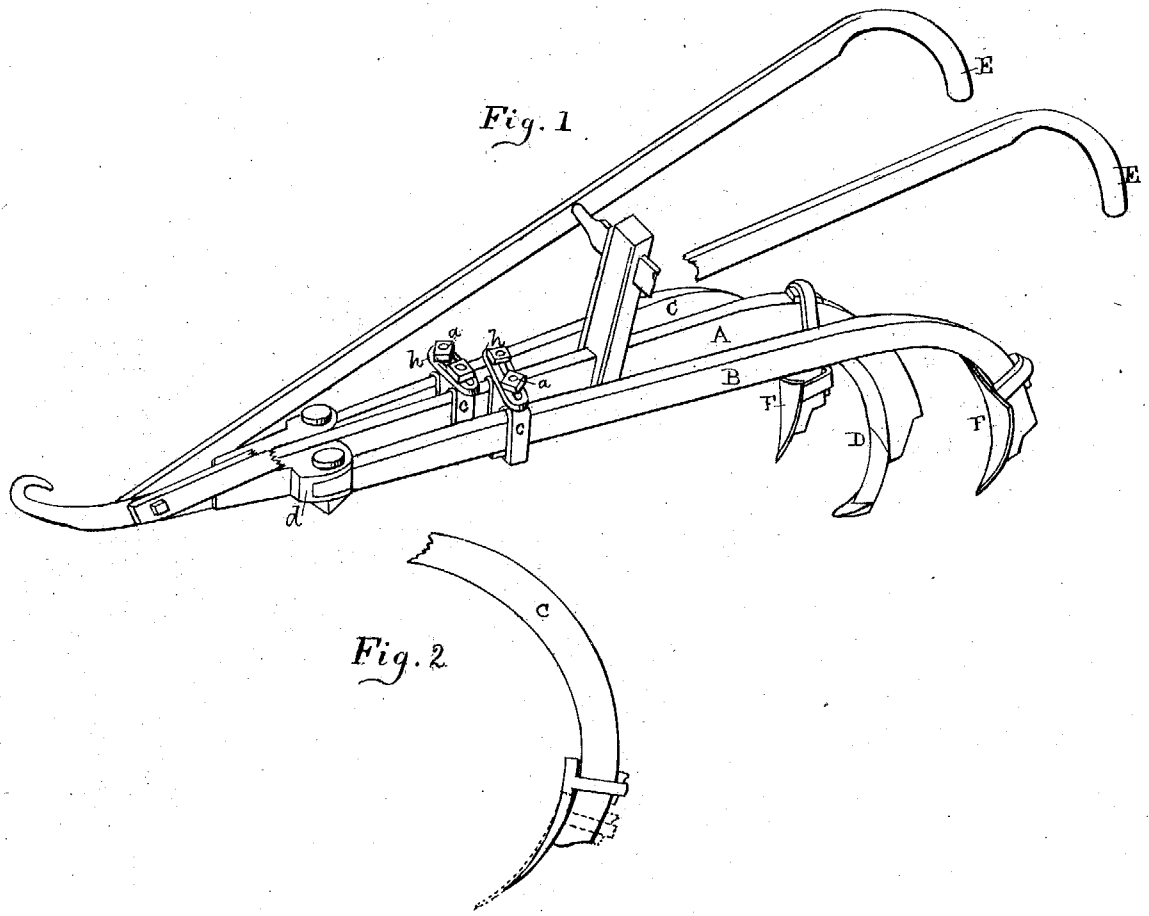

R. M. MELTON.

Improvement in Cultivators.

No. 4,875. Reissued April 16, 1872.

Witnesses:

D. B. Stuart

M. J. Knight

Inventor:

Reuben M. Melton (by) A. McCallum

Atty.

AM. PHOTO-LITHOGRAPHIC CO. N.Y. (OSBORNE'S PROCESS).

UNITED STATES PATENT OFFICE.

REUBEN M. MELTON, OF CRIGLERSVILLE, VIRGINIA.

IMPROVEMENT IN CULTIVATORS.

Specification forming part of Letters Patent No. 24,227, dated May 31, 1859; reissue No. 4,875, dated April 16, 1872.

Specification describing certain Improvements in Cultivators, invented by REUBEN M. MELTON, of Criglersville, in the county of Madison and State of Virginia.

My invention relates to improvements in cultivator-plows or gang-plows in which two or more plows are connected with the same frame. The object of the improvements is to facilitate the adjustment of the distance between the plows, and to regulate the pitch of the points as the plows are raised or lowered on the curve of the beam. The invention for effecting these objects consists in connecting the beams of the side plows with the beam of the central plow by means of an adjustable link in connection with an adjustable slide on the beam, by means of which a greater range of motion may be given to the beams with a short link, thus doing away with the long connecting-bars in general use for effecting the same object. It also consists in providing plows or shovels and a colter attachment constructed of such form, in connection with the form of the curve of the rear end of the beams, as to permit their being adjusted by sliding them up or down the curves, thereby changing the inclination or pitch of the points so as to increase or decrease the downward draft of the plows, and to run at different depths, as desired, while, at the same time, the backs are supported by the plow-beams, which thereby prevent them from springing or bending when subjected to heavy strains.

In the accompanying drawing, Figure 1 is a perspective view of a cultivator or gang-plow having my improvements. Fig. 2 is a side elevation of one of the curved plow-beams, showing the method of adjusting the shovels or plows.

In Fig. 1 is represented a gang-plow, consisting of a series of plows arranged on three separate beams—a central beam, A, and two side beams, B and C—which are connected to the center by a joint-piece, *d*, that admits of their moving laterally to vary the distance between the plows. These beams are rectangular bars of iron of different lengths, and are curved downward at their rear ends for the purpose hereinafter set forth. The side beams are connected with and adjusted to the center beam by means of adjustable links *h*, which pass over the heads of adjustable slides *c*, and are confined thereto by a nut, *a*, that screws down on the head of the slide and prevents the beam from moving. The slides are keyed to the under side of the beam and can be moved thereon nearer to or further from the center of motion of the side beams, which admits of the beams having a great range of motion laterally with the use of short connecting-links. The plow-beams are curved downward at their rear ends, so as to form standards on which the plows can be adjusted and secured at any point up or down the curve. Any of the well-known forms of shovel-plows may be used with these curved beams. The plow is attached to the beam by means of a staple or sleeve riveted to its back, which is made of the proper size to fit the beam, and secured thereto by a key, so that it can be adjusted up or down the curve of the beam to the required height for the depth of the furrow. By this means the plows can be made to run deep or shallow, or at different depths, as desired. D represents a colter of peculiar form, shown in Fig. 1 as attached to the center beam in the same manner as the plows F; it is also, like the plows, so arranged, in connection with the curve given to the plow-beam, that, by sliding it on the beam, it is raised or depressed, while, at the same time, the pitch or inclination of the point is raised so as to increase or lessen the downward draft of the plows; and, at the same time, the back of the colter is supported in all positions through a great portion of its length by the plow-beam, which stiffens the colter and increases its capacity to resist heavy draft upon it in passing through compact soil. When plowing very shallow furrows this colter attachment may be of great benefit in steadying the plows and preventing them from being thrown out of the ground. E E represent the plow-handles secured to the beam.

In a gang-plow so constructed it will be obvious that the distance between the plows can be readily adjusted by the short links, as shown and described, and that the plows can be adjusted at any point on the curve of the beam, so as to run deep or shallow, as desired. Further description of the construction and operation of my invention is therefore deemed superfluous.

What I claim as my invention is—

1. The adjustable links *h* and adjustable slides *c*, constructed substantially as described, and arranged to operate with and for the purpose of adjusting the distance between the plow-beams, as set forth.

2. The colter D, constructed substantially as described, with shovels or plows F, when both colter and shovels are independently and freely adjustable up or down the curved beams, so as to run deep or shallow, or at different depths, as set forth.

REUBEN M. MELTON.

Witnesses:
A. W. BOWLER,
WM. B. INKINS.